US007103773B2

(12) United States Patent
Erickson et al.

(10) Patent No.: US 7,103,773 B2
(45) Date of Patent: Sep. 5, 2006

(54) MESSAGE EXCHANGE IN AN INFORMATION TECHNOLOGY NETWORK

(75) Inventors: John S. Erickson, Norwich, VT (US); Mark Schlageter, Merrimack, NH (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 850 days.

(21) Appl. No.: 09/983,895

(22) Filed: Oct. 26, 2001

(65) Prior Publication Data

US 2003/0081791 A1   May 1, 2003

(51) Int. Cl.
  *H04L 9/32*  (2006.01)
  *H04L 9/34*  (2006.01)
  *H04L 9/12*  (2006.01)

(52) U.S. Cl. ..................... 713/170; 713/160

(58) Field of Classification Search ............... 713/176, 713/193
  See application file for complete search history.

(56) References Cited

U.S. PATENT DOCUMENTS 5,369,702 A * 11/1994 Shanton ...................... 713/166
6,002,769 A * 12/1999 McGough ..................... 380/28
6,154,840 A * 11/2000 Pebley et al. ............... 713/160
6,694,433 B1 * 2/2004 Kolouch ...................... 713/176

OTHER PUBLICATIONS

Xavier, Eugene. "XML based Security for E-Commerce Applications." IEEE(2001):10-17.*
Kudo et al."XML Document Security based on Provisional Authorization."ACM(2000):87-96.*
Bertino et al."Controlled Access and Dissemination of XML Documents."ACM(1999):22-27.*
Dillaway et al."XML Encryption Syntax and Processing."(2000):1-23.*
The SSL Protocol Version 3.0 found at http://www.netscape.com/eng/ss13/draft302.txt.

* cited by examiner

Primary Examiner—Gilberto Barron, Jr.
Assistant Examiner—Venkat Perungavoor

(57) ABSTRACT

Messages including encrypted data and having the form of XML documents are exchanged within an information technology network according to Simple Object Access Protocol (SOAP). Each message includes a session key (encrypted to the public key of the party receiving the message) within the XML document containing the encrypted data, meaning that each message is interpretable in a "stand alone" condition, without reference to some shared state (such as the session key for instance) between the parties involved in the messaging. Tags are used to generate modules within the document, and enable easy and convenient separation of elements of the document for distribution by the SOAP gateway protocol handler to the relevant application.

29 Claims, 10 Drawing Sheets

```
                POST /MyRemoteService HTTP/1.1
                Host: www.myremoteserver.com
  210          ─Content-Type: text/xml; charset="utf-8"
                Content-Length: nnnn
                SOAPAction: "http://www.myremoteserver.com/MyRemoteService"

<SOAP-ENV:Envelope
                   xmlns:SOAP-ENV="http://schemas.xmlsoap.org/soap/envelope/"
                   SOAP-
                ENV:encodingStyle="http://schemas.xmlsoap.org/soap/encoding/">
                    <SOAP-ENV:Header>
                        <publicKey>

BgIAAACkAABSU0ExAAIAAAAEAAQC7420MaNid2c6K58B1LGKmLit/5B1NJqZQCJGZ/t
           202  qaJXA2u
                        </publicKey>
                        <sessionKey>
                AQIAAAJmAAAApAAACcxsSN4bOZyB86PH5kw5j746CMfs4ceboJck5vGdDF+0ACLB33
                WrKCuAgibeS1gputC00i1CNck/yDKWGwiQNQ==
                        </sessionKey>
                    </SOAP-ENV:Header>

<SOAP-ENV:Body>
  200              <m:RemoteServiceMethod
                xmlns:m="http://namespaces.myremoteserver.com">

<unencryptedParameter0>myUnencryptedParameterValue</unencryptedPar
                ameter0>
           204
                <encryptedParameter1>wDVsjtXvG2Rv8fOJfOcGvg7+OjgMWEzk</encryptedPa
                rameter1>

<encryptedParameter2>sdkjdklJASAAAwladKLALK;lalakslla</encryptedPa
                rameter2>
                        </m:RemoteServiceMethod>
                    </SOAP-ENV:Body>
                </SOAP-ENV:Envelope>
```

Fig. 8a

```
POST /MyRemoteService HTTP/1.1
Host: www.myremoteserver.com
Content-Type: text/xml; charset="utf-8"
Content-Length: nnnn
SOAPAction: "http://www.myremoteserver.com/MyRemoteService"

<SOAP-ENV:Envelope
   xmlns:SOAP-ENV="http://schemas.xmlsoap.org/soap/envelope/"
   SOAP-ENV:encodingStyle="http://schemas.xmlsoap.org/soap/encoding/">

<SOAP-ENV:Header>

<publicKey>
BgIAAACkAABSU0ExAAIAAAEAAQC7420MaNid2c6K58B1LGKmLit/5BlNJqZQCJGZ/tqaJ
XA2u
     </publicKey>

<sessionKey>
AQIAAAJmAAAApAAACcxsSN4bOZyB86PH5kw5j746CMfs4ceboJck5vGdDF+0ACLB33WrK
CuAgibeS1gputC00ilCNck/yDKWGwiQNQ==
     </sessionKey>

</SOAP-ENV:Header>

<SOAP-ENV:Body>

<m:RemoteServiceMethod
        xmlns:m="http://namespaces.myremoteserver.com">

<unencryptedParameter name="param1">
                 myUnencryptedParameterValue
             </unencryptedParameter>

<encryptedParameter name="param2">
                 wDVsjtXvG2Rv8fOJfOcGvg7+OjgMWEzk
             </encryptedParameter>

<encryptedParameter name="param3">
             wDVsjtXvG2Rv8fOJfOcGvg7+OjgMWEzk
             </encryptedParameter>

<encryptedParameter name="param4" key="paramKey">

<key name="paramKey">
             AQIAAAJmAAAApAAACcxsSN4bOZyB86PH5kw5j746CMfs4ceboJck5vGdD
             F+0ACLB33WrKCuAgibeS1gputC00ilCNck/yDKWGwiQNQ==
             </key> sdkjdklJASAAAwladKLALK;lalakslla

</encryptedParameter>

</m:RemoteServiceMethod>

</SOAP-ENV:Body>

</SOAP-ENV:Envelope>
```

Fig. 8b

MESSAGE EXCHANGE IN AN INFORMATION TECHNOLOGY NETWORK

BACKGROUND TO THE INVENTION

1. Field of the Invention

The present invention relates to the exchange of messages containing encrypted data between different locations within a network, and in particular to structures of such messages which facilitate handling of the messages in an expedient manner.

Increasingly, services which were at one time only available by post or in person, such as banking services for example, are being offered either by telephone, or via an information technology network such as the internet. The provision of such services via these new media raises issues both in relation to authentication of the identity of the sender of a message, and security of the information passed in the message. In recent years, these problems have both been addressed by the widespread adoption of public key encryption technology, typically in combination with a secret, symmetric key.

This works in the following manner: Sensitive data within a message is encrypted using what is known as a session key. The session key is symmetric and, therefore, functions in the same manner as a traditional secret key, i.e., possession of the key enables decryption of a message encrypted using it, because the same key is used for encryption and decryption, the decryption process simply being the reverse of the encryption process. Consequently, both encryption and decryption processes with a symmetric key require only relatively small levels of computing power. The session key is then encrypted using what is known as the "public key" of the party for whom the encrypted message is intended. The encrypted session key and the message encrypted with the session key are then sent to the receiving party. The public key is, as its name suggests, freely available in the same way that a telephone number may be in a telephone directory. However, the public key is an asymmetric key, meaning that a different key to the public key, known as a private key (which is secret to the receiving party), is required for decryption; the process of decryption is, therefore, not the inverse of the encryption process. The encrypted session key cannot, therefore, be decrypted by a party who is only in possession of the public key used to encrypt it, meaning that the message is secure. The process of asymmetric decryption using a private key requires a relatively high level of computing power. However, because the private key is only used to decrypt the session key (which is usually small is size compared with the body of the message), and the decrypted session key is then used to perform symmetric decryption on the body of the message, this technology may be adopted by any private user with a standard desktop computer. The present invention is concerned, inter alia, with the structure of such messages and the manner in which such messages are handled.

2. Description of Related Art

An existing approach, used within the context of providing services via the internet or worldwide web, is known as "Secure Sockets Layer" protocol (SSL), according to which shared state, such as the session key, must be maintained between messages for the duration of the interaction between, for example, a provider of services and a consumer. Inherently this is a somewhat inflexible approach, since it requires, for example, that each pair of messages conform to a criterion (such as the session key) laid down in a previous message. SSL protocol is described in more detail at http://www.netscape.com/eng/ss13/draft302.txt.

SUMMARY OF THE INVENTION

By contrast, the present invention seeks to provide a message structure and a manner for handling such a message structure which enables each individual interaction between, for example, a consumer of web services and the provider thereof to stand alone.

According to an aspect of the present invention, data, including encrypted data, is passed from one party to another in the form of a modular document, within which a session key is securely provided for the encrypted data within that message. Thus for example encrypted data within a message, such as for example an encrypted session key and any data encrypted using the session key (such as a service request), can be included in a single module of the document, which may be thought of as forming a sub-document. Upon receipt of a message containing such a module, the message protocol handler may process and route any non-encrypted modules of the message, leaving the decryption to be performed by the actual programme which is intended to perform, for example, the service requested in the encrypted message. A given modular document may contain one or more sub-documents, and furthermore, the structure of a document may be such that it has what may be termed a nested modularity, with one sub-document containing one or more further sub-documents, one or more of which may in turn contain yet further sub-documents, and so on. A message structured in such a way may be thought of as comprising a plurality of layers, rather like an onion.

The formatting or structuring of the document to achieve the requisite modularity may be achieved in any suitable manner. A typical and currently favoured form of document is a document having a structure defined by a computer markup language, which uses what are known as tags to create format instructions for the document, one example of which is Extensible Markup Language (XML). However any documentary form which provides modularity may be used, whether the modularity is evident as in the case of documents formatted using tag-oriented markup languages, or hidden.

A further and independent aspect of the present invention therefore provides an XML document containing a first set of tags defining a first module of the document in which data relating to one or more keys is contained, and a second set of tags defining a module of the message containing a message body which includes data encrypted with a key located in the first module.

In one embodiment, messages are exchanged using a protocol known as Simple Object Access Protocol (SOAP), and have the form of documents written using XML tags.

Yet a further aspect of the present invention provides a method of requesting a service from an enterprise via an information technology network, comprising the steps of: generating a document having at least two distinct modules; including within one of the modules a session key encrypted using the public key of the enterprise; and including within another module a message relating to the service request and having at least one element encrypted with the session key.

BRIEF DESCRIPTION OF DRAWINGS

Embodiments of the present invention will now be described, by way of example, and with reference to the accompanying drawings, in which:

FIGS. 8a and 8b are examples of XML documents used in SOAP messaging.

DESCRIPTION OF PREFERRED EMBODIMENTS

Figure 1:
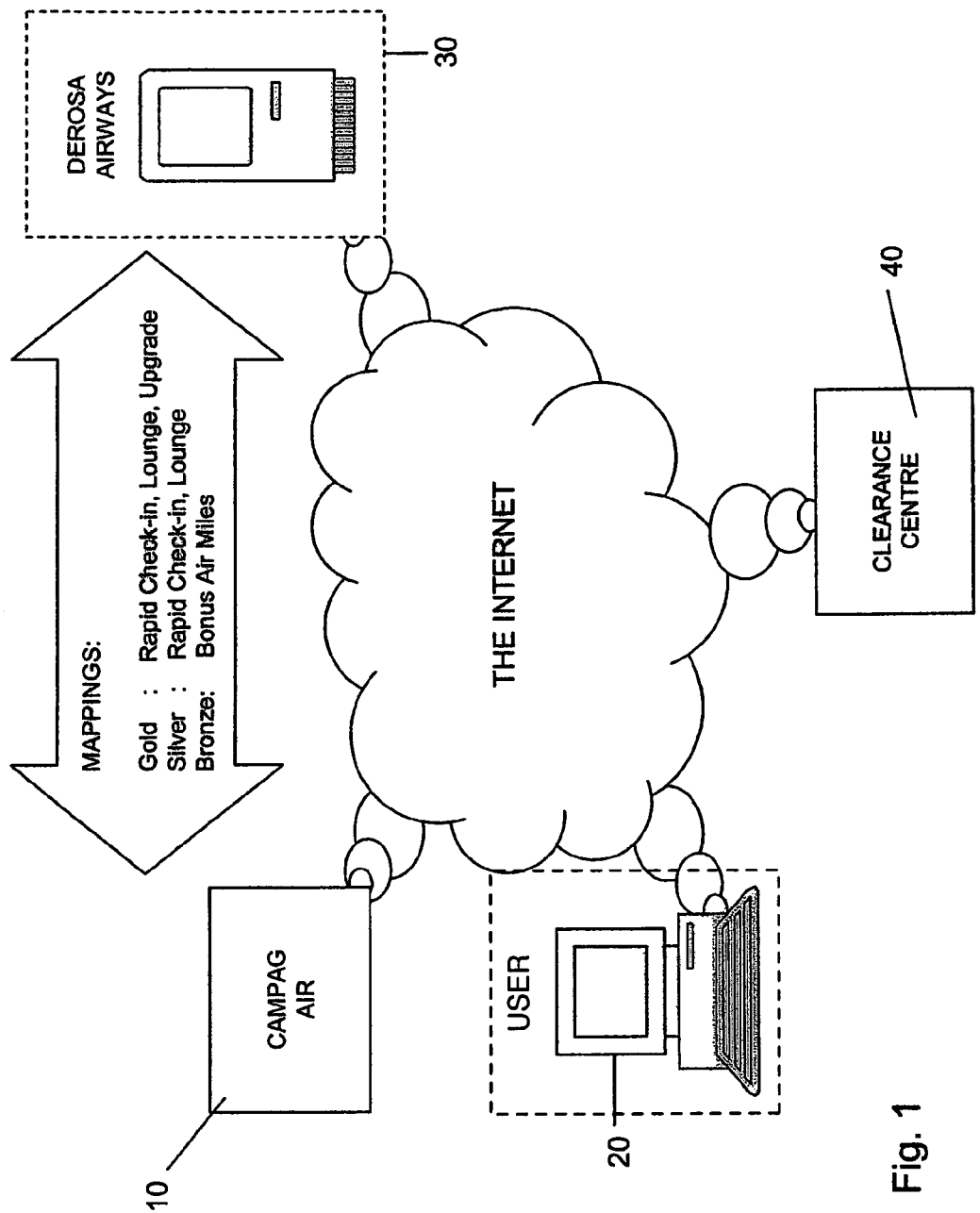
FIG. 1 is an illustration of the parties involved the scenario used to illustrate an embodiment of the present invention.

Referring now to FIG. 1, an embodiment of the present invention will now be illustrated in the context of a commercial transaction conducted in accordance with a dealing protocol known as the Gladney safe-dealing model, which is known per se. The entities involved in the scenario include what is generically known under the terms of the safe dealing model as a Requesting Organisation (RO), which in the present example is an airline 10, Campag Air. Campag Air 10 sell flights via a network, which in the present example is the Internet, to End Users 20. Frequent flyers with Campag Air enjoy membership of the Campag Air frequent flyer club, and are issued with Enrolments certifying their level of membership (e.g. in this example, Gold, Silver and Bronze). Typically an Enrolment may be represented by a card similar to a credit card on which the user's name and level of membership are indicated. However, for bookings made via the internet, Enrolments are issued to End Users 20 (via the internet) upon request via a portal operated by Campag Air 10 expressly for that purpose.

A competing airline, which in generic safe dealing terms is known as the Servicing Organisation (SO), DeRosa Airways 30, has concluded an agreement with Campag Air 10, so that members of one airline's frequent flyer club can enjoy corresponding benefits as a result of their membership when flying with the other airline. In order to enable each airline 10, 30 to implement the agreement for their customers, the airlines negotiate mappings between the various levels of membership of, for example the Campag Air frequent flyer club, and the privileges to be afforded by DeRosa Airways to Campag Air members having a given level of membership when using DeRosa Airways. Reciprocal mappings will be made for DeRosa Airways members, but these are not discussed further in the present illustrated scenario, where DeRosa Airways are acting as the Servicing Organisation.

Thus for example, as a result of the agreement between the airlines, it may be agreed that, as in the case of the present example, GOLD membership of Campag Air club entitles members to access to the passenger lounge, rapid check-in facility, and a free upgrade where this is possible. Further mappings are made for the privileges to be granted to Silver and Bronze members, and shown in FIG. 1. Once agreed, the mappings are then held on behalf of each of the airlines by a trusted third party, known in the safe dealing model as a Clearance Centre 40.

Figure 2:
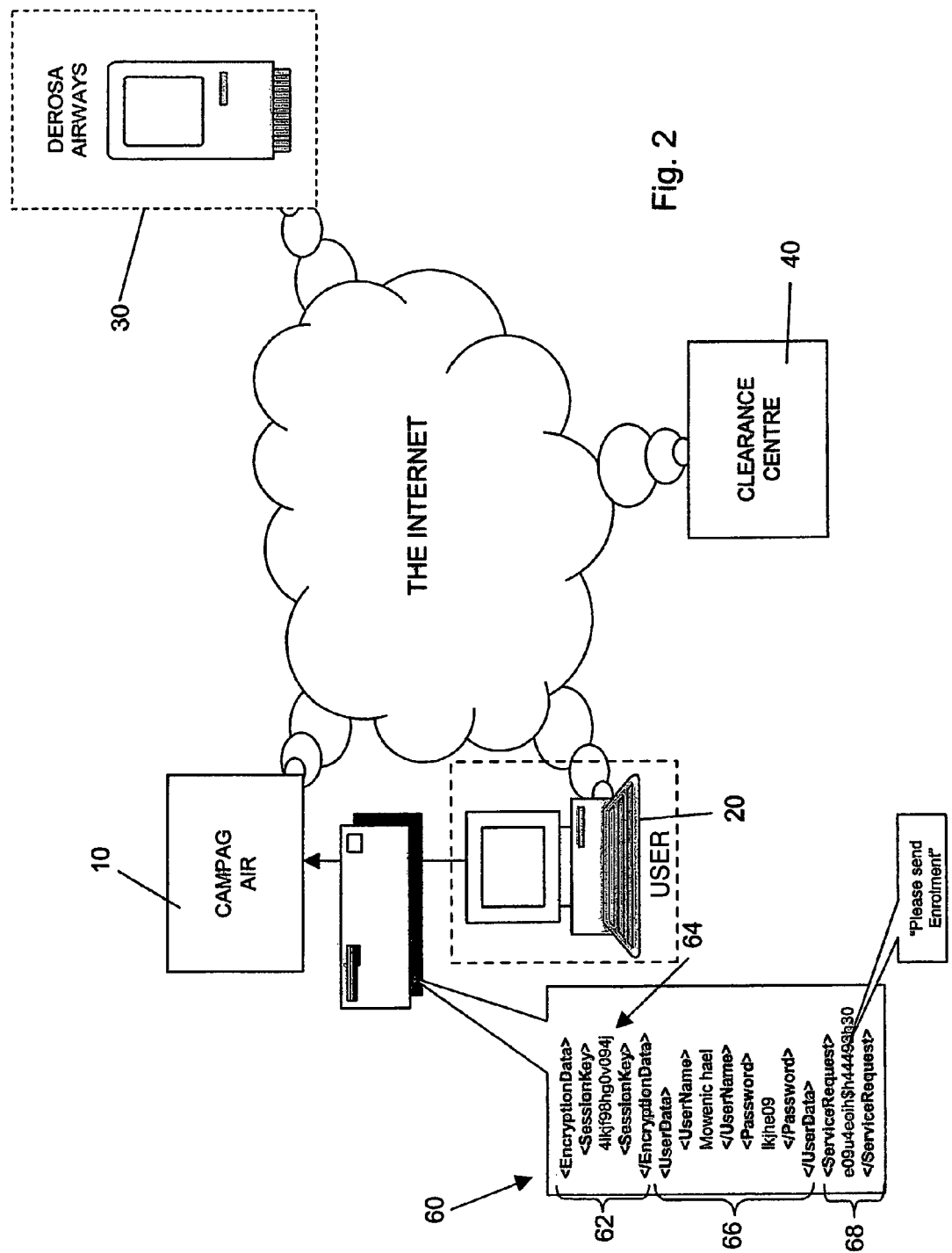
FIGS. 2 to 7 are figures illustrating different steps in the scenario.

Referring now to FIG. 2, to request an Enrolment from Campag Air 10 in electronic form, for example for use when booking a flight via the internet, the End User 20 sends a message to a website operated either by or on behalf of Campag Air 10. For the purpose of illustrative simplicity this is shown in FIG. 2 as the End User connecting via the Internet with Campag Air, though no limitation is intended by this. The message has the form of a document 60 (i.e. a computer file that contains text and possibly format instructions), and in the present example the document is a modular document whose format instructions are written in Extensible Markup Language (XML), widely known simply as an XML document. The format of the document is defined by what are known as "tags", which indicate the boundaries of particular elements of the document. The character strings which make up the tags themselves are used by programmes which process XML documents to determine what action should be taken with regard to content of a given pair of tags. Typically the character strings which make up a tag are chosen so they also provide, at least to some extent, an intuitive indication of the nature of the content within them, and although this is the case in the examples of the present embodiment, this is not necessary. One example of a programme that processes XML documents which is particularly applicable to the illustrated embodiment is a message protocol handler, which deals with the receipt and dispatch of messages (such as a Simple Object Access Protocol (SOAP) Gateway, for example). Tags may be thought of as being analogous to format control "codes" within a document written using word processing software, such as Wordperfect (TM) software, for example.

The documents shown in the present application are examples of XML documents, but certain elements of the documents required for proper message exchange in accordance with SOAP, for example, have been omitted for clarity. In addition, the illustrated documents do not contain namespaces, which ascribe a unique semantic meaning to a particular tag, or the URL of what is known as a schema, a set of definitions of data elements within an XML document which ascribe meanings (for example indicating that the tag <name> means surname).

In the document 60 there are a pair of <EncryptionData> tags defining the boundaries of a module 62 of the document containing data relating to encryption of the data within the message 60. Within the EncryptionData module 62 defined by these tags is a further module, a SessionKey module 64 containing a session key to which data in the message is encrypted, and which itself is encrypted using the Campag Air public key. Typically this public key will be available from a directory, and is likely to change on a regular basis, (e.g. daily). The message additionally contains a UserData module 66, containing sub-modules giving the name and password (both of which are encrypted to the session key) of the member requesting the Enrolment, in order to enable Campag Air to ensure that any electronic Enrolment is only issued to a bona fide member, and a ServiceRequest module 68 containing the request (also encrypted to the session key) for the Enrolment. For the purposes of illustration of the present example, elements of encrypted messages are additionally indicated in decrypted form, or "in the clear" in quotations in a distinct callout box, and in this drawing the service request is shown in the clear to be "please send Enrolment".

Figure 3:
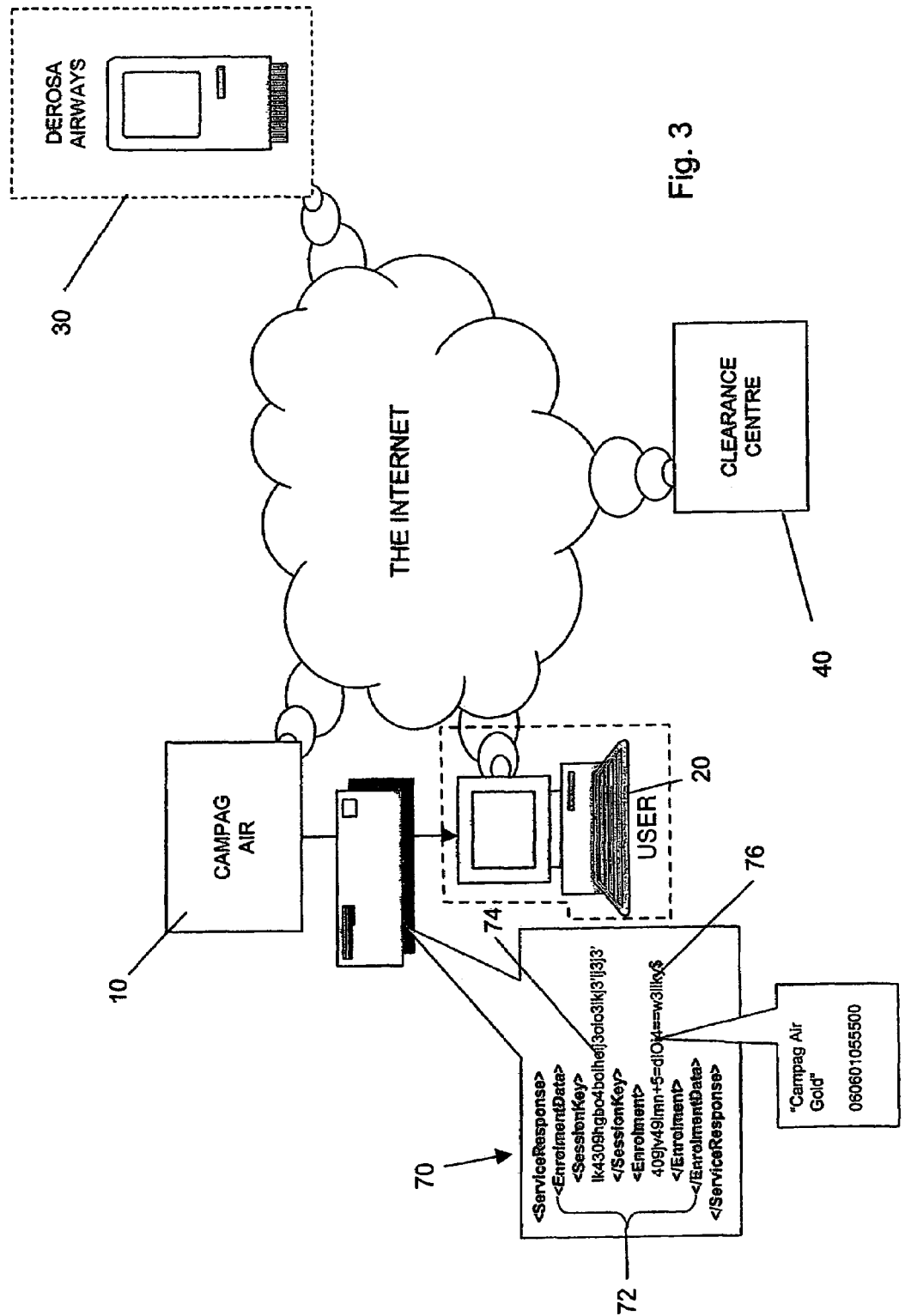

Referring now to FIG. 3, in reply to the request to send an Enrolment, Campag Air return to the End User a message in the form of a further XML document 70. The document 70 is bounded by "<ServiceResponse>" tags defining the extent of the message, and within which is a module 72 of EnrolmentData. The EnrolmentData module 72 contains two elements: a SessionKey 74, which it should be noted is encrypted to the public key of the Clearance Centre 40, and an Enrolment 76 which is encrypted to the session key. As can be seen from FIG. 3, the Enrolment states simply the Airline club, membership level, and includes an expiry time in DDMMYYHHMMSS. In practice this expiry time will be only a matter of hours subsequent to the dispatch of the Enrolment to the End User 20. The reason for this is that it can be seen that the Enrolment includes no indication of ownership, and this conforms to an accepted practice of reducing the amount of data sent across a public network to a minimum, and avoiding the use of personal identification details unless necessary. In this example therefore, possession and presentation of the Enrolment 76 entitles the bearer, prima facie to the relevant benefits regardless of their identity, in the same way as applies, for example, to a purchase made with pound or dollar notes. The restriction on the "time-to-live" of the Enrolment therefore limits the damage that may occur in the event of the Enrolment being misappropriated, while encryption of the Enrolment, and more particularly the time-to-live element of the Enrolment, reduces the risk of tampering following misappropriation, for example with a view to fraudulently extending the expiry time.

Figure 4:
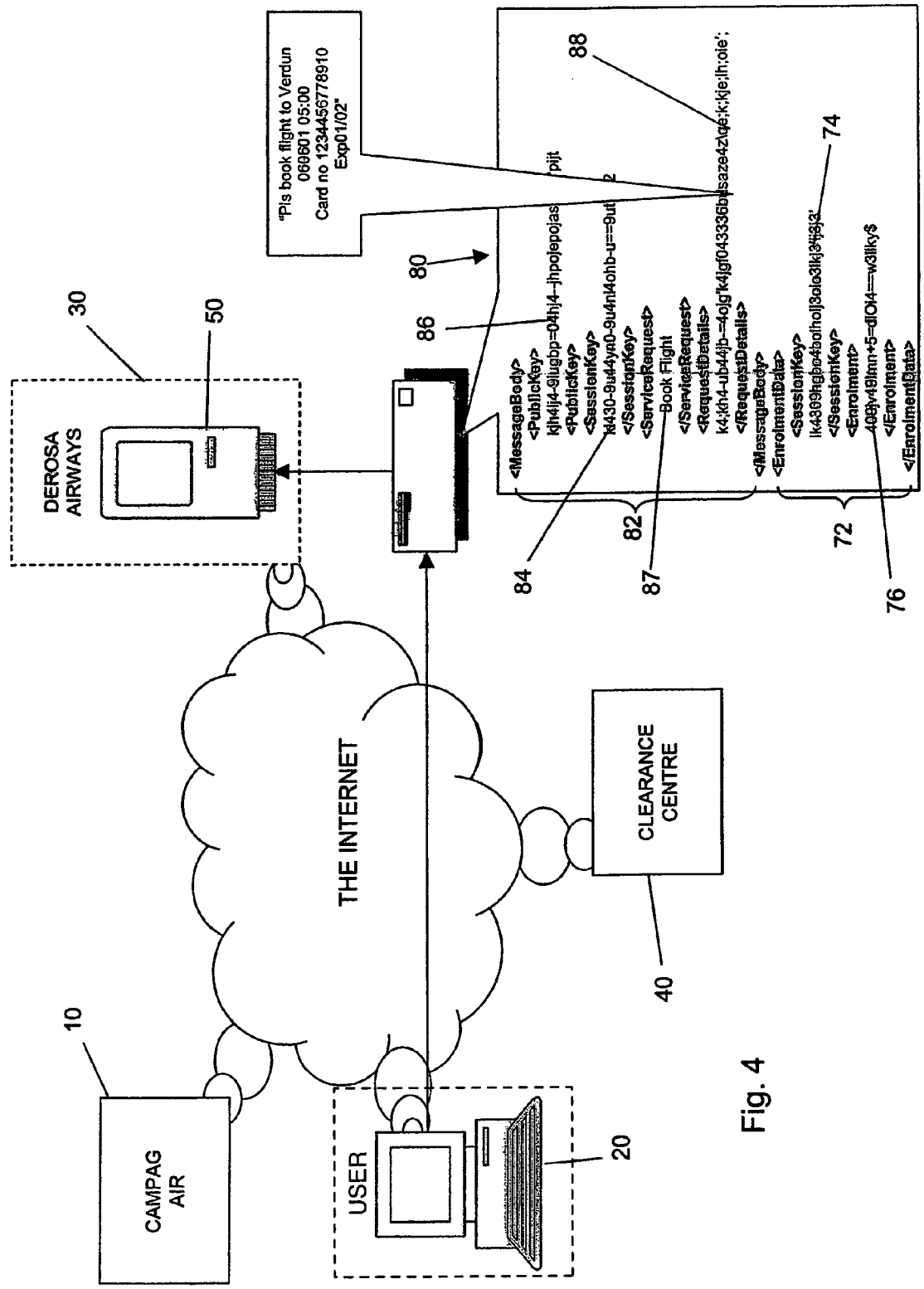

Referring now to FIG. 4, having obtained the Enrolment (which the End User will typically store in secure storage until it is used), the End User 20 then sends a message 80 to a resource server 50, acting on behalf of DeRosa Airways 30, requesting a flight. The message 80 as illustrated contains two modules: a MessageBody module 82 and the EnrolmentData module 72. In the illustrated embodiment they are shown as being located distinctly, but the EnrolmentData module 72 could equally be located within the MessageBody 82 module. The MessageBody module 82 contains the encryption data for decrypting the message, i.e. the session key 84 to which the message is encrypted, together with the public key 86 of the End User. The End User's public key is provided in the outgoing message to enable the Resource Server 50 to encrypt any reply to the public key of the End User 20, since it is unlikely that the Resource Server 50 will be able to retrieve this from behind a firewall of the End User 20. The MessageBody module 82 also contains the service request 87 written in the clear to enable rapid and efficient processing of the request, and request details 88, encrypted to the session key 84. The service request 87 in this example is a request to book a flight, and the request details 88 give the date, time and payment details for fulfilling the request.

Figure 5:
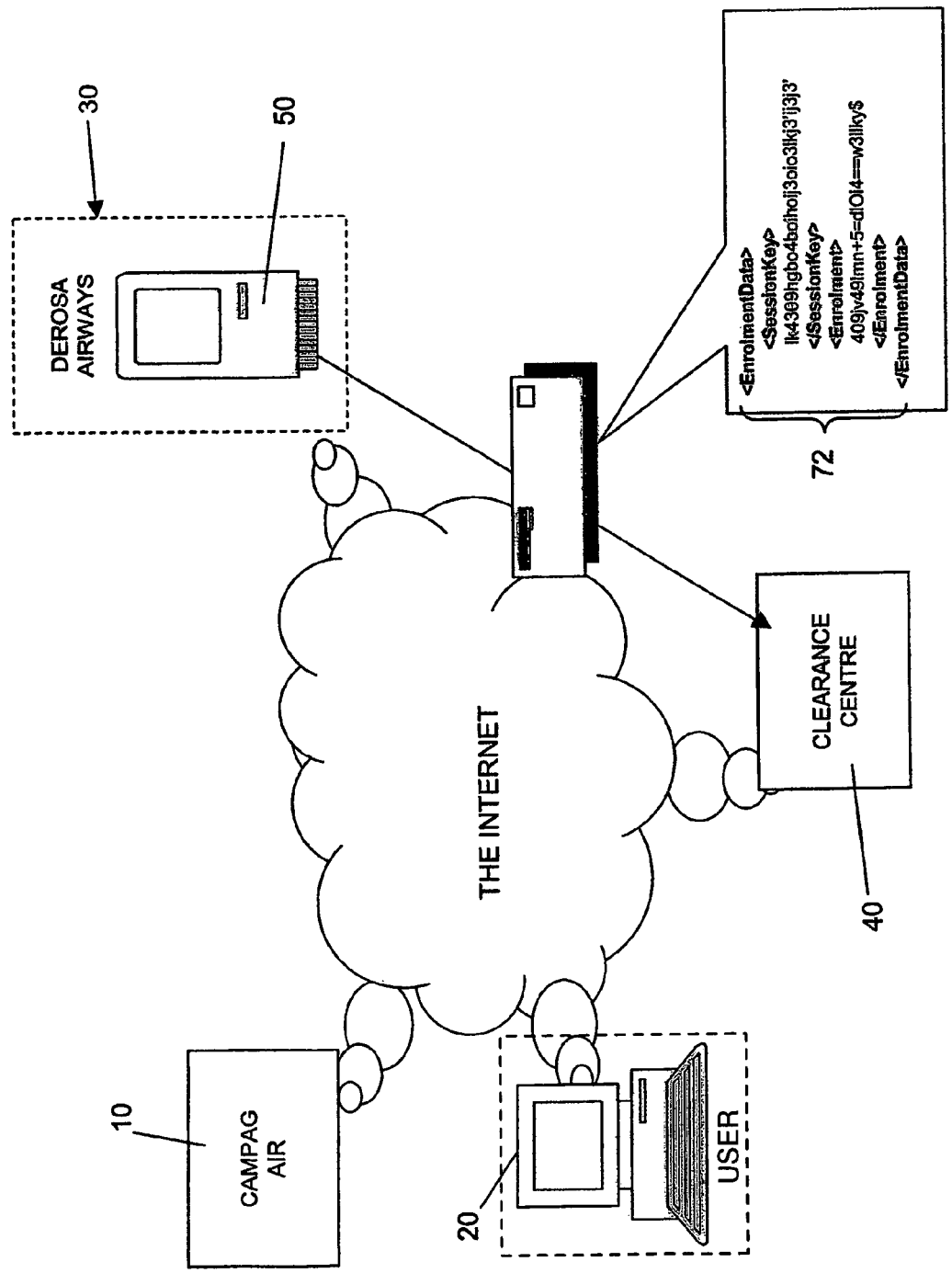

Upon receipt of the message 80, the two modules 72, 82 are processed in accordance with the particular protocol for handling messages employed by, in this example, the End User 20 and the Resource Server 50. Thus the Resource Server 50 deals with the MessageBody module 82 itself (i.e. interpreting and acting upon the service request), but, being unable either to decrypt the EnrolmentData module 72 (which would require the private key of the Clearance Centre 40) or to understand it in decrypted form (the "Enrolments" of the Campag Air frequent flyer club having no meaning to the Resource Server 50 acting on behalf of DeRosa Airways) passes the entire EnrolmentData module 72 in "unopened" form, on to the Clearance Centre 40, as illustrated in FIG. 5.

Figure 6:
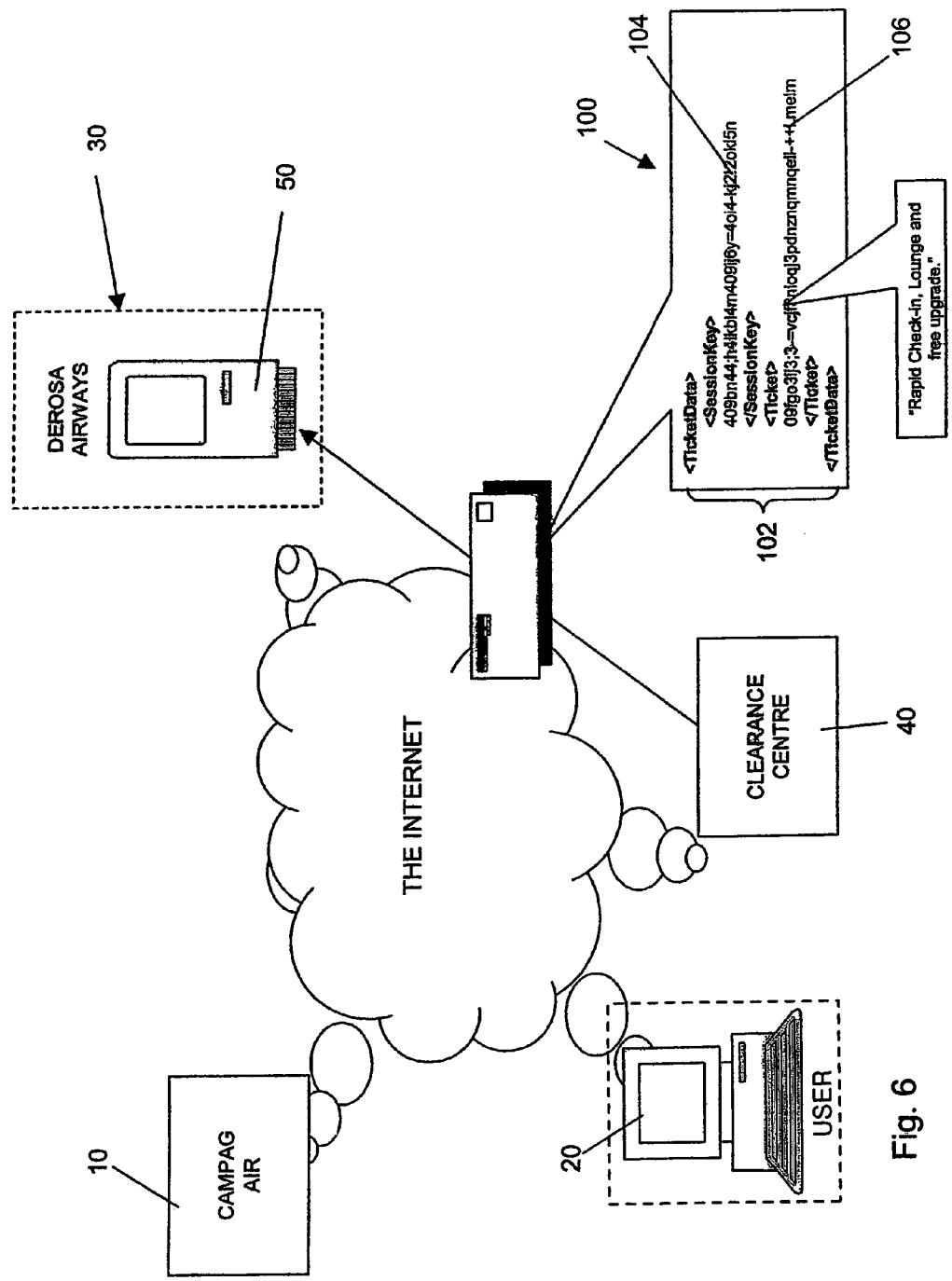
Figure 7:
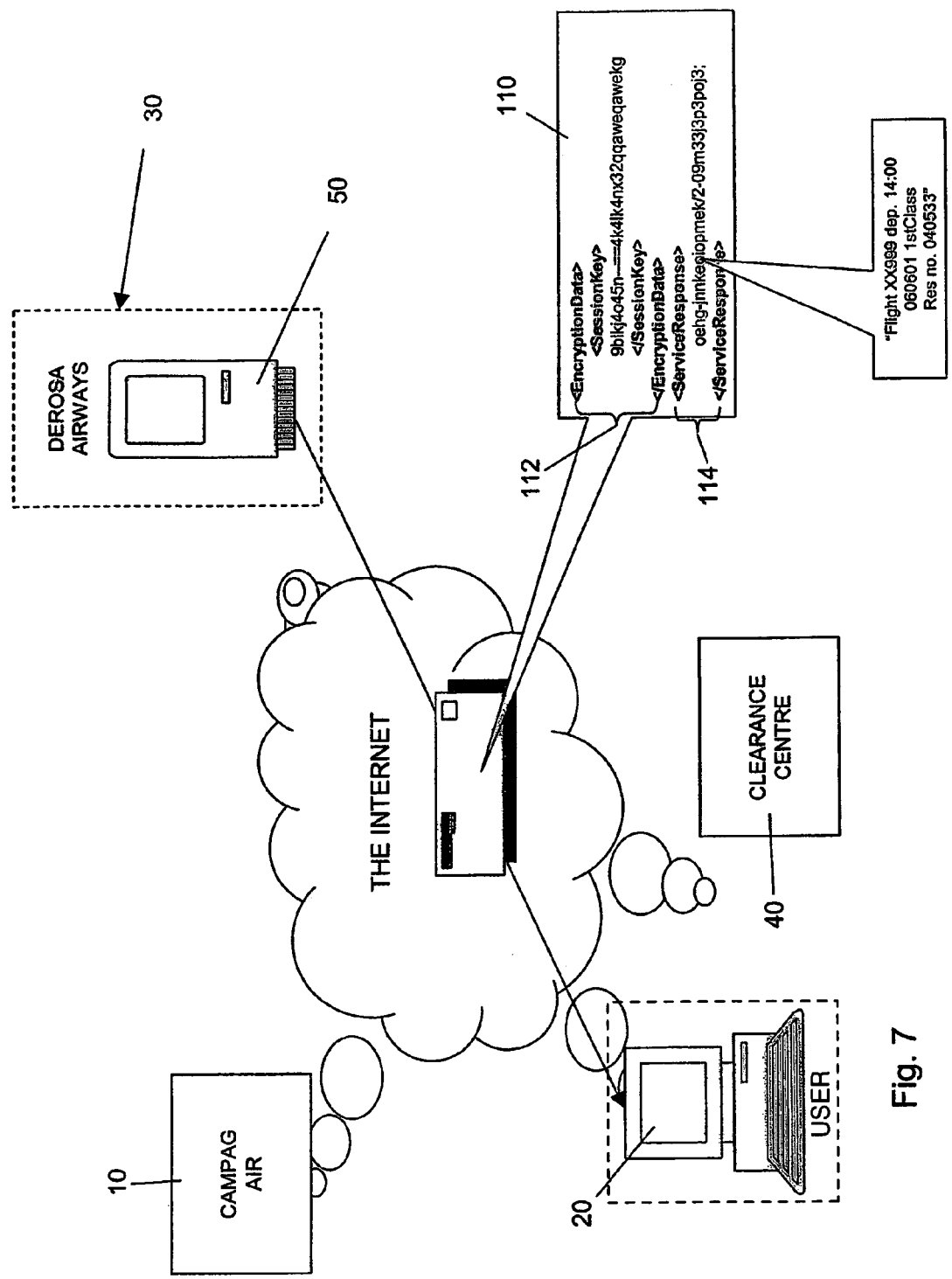

Referring now to FIG. 6, the Clearance Centre 40 decrypts the session key using its private key, and then the Enrolment 76 using the decrypted session key. It then maps the Enrolment 76 to a Ticket (assuming that the Enrolment is still within its "time-to-live" window) in accordance with the mappings negotiated between Campag Air 10 and DeRosa Airways 30 and, having done so, generates a message in the form of an XML document 100 having a TicketData module 102, within which are a session key 104 encrypted to the public key of the Resource Server 50, and a Ticket 106, encrypted to the session key, detailing the appropriate privileges and which, in the clear, reads "Rapid Checkin, Lounge and Free upgrade". Upon receipt of the Ticket, the Resource Server is able to process fully the service request of the End User, and does so in accordance with the information in the service request, together with the Ticket 106 from the Clearance Centre 40. Having done so, it then generates a message in the form of yet a further XML document 110, illustrated in FIG. 7. In the illustrated example, the document 110 has an EncryptionData module 112 containing a session key encrypted to the public key of the End User (which it may be recalled was included in the original service request message 80), and a ServiceResponse module 114 containing a message encrypted to the session key, which in the clear gives the flight details and the reservation number. The session key which accompanies the message containing the service response could be either the same as the session key sent by the End User to the Resource Server, but this time encrypted to the public key of the End User, or a new session key. An important feature of this embodiment, however, is that a session key to which data in a message is encrypted accompanies each such message. The result of this is that each message stands alone, or may be said to be "atomic", meaning that each message may be interpreted without referring to an earlier message in order to restore some pre-existing condition or state between the two messaging parties (such as a session key). For example, the End User may have sent and received several messages between dispatching the message 80 containing the service request, and receiving the service response. If the service response were encrypted to the session key originally dispatched in service request message 80, but was not included within the service response, the End User would have to determine the session key to use in order to decrypt the service response, possibly by referring to previous messages it had dispatched to identify correspondence between the incoming service response message 110 and the outgoing service request message 80 containing the session key to which the service response is encrypted. In the example of the present embodiment, this is avoided by having atomic messages containing the session key to which data within them is encrypted.

The examples of messages which have been used in the illustrated embodiment above have had the form of XML documents, but as previously mentioned, certain elements of these documents which served no purpose in illustrating the messaging structure and scenario were omitted for clarity. Referring now to FIG. 8A an example of a genuine XML document used for messaging according to SOAP includes a SOAP envelope 200, within which are two modules: a SOAP header 202 containing the public key of an End User requesting a service (to be used in the service reply as in the case of the messages 80 and 110 in the example of FIGS. 2 to 7) and a session key for the data in the message; and a SOAP body module 204 containing one unencrypted parameter (typically the service request), and two encrypted parameters. It will be noted that the XML tags used to define the SOAP envelope include the xmlns (namespace), and the schema giving the meaning of elements in the document. The XML document in FIG. 8b differs from the document of FIG. 8a in one important respect. It can be seen that the SOAP body module 304 contains three encrypted parameters, and that the XML tags for these parameters attribute a name to each of them (name="param2", etc.). The tags for "param2" and "param3" contain no further attributes of the parameters within them; however the tags for "param4" additionally includes the name of a special session key which should be used to decrypt it—"paramkey". The "paramkey" is located within the tags of "param4", together with the parameter itself, so that the tags for "param4" effectively define a further module 306 of the document. The significance of this is that the document of FIG. 8*b* contains two session keys. One of these is in the SOAP header, which is used as a "default" key, with all parameters whose tags do not specify a key for decryption being encrypted to the default key. The other (special) key, "paramkey" is specified in the tag attributes for parameter "param4", and so indicates that "param4" is encrypted to "paramkey". Advantageously (though not essentially), when specifying a key in this manner, the specified key is located within a module of the document which also contains the parameter encrypted to this key, so that both the key and encrypted parameter may be moved as a unit, preserving the atomic nature of the module. In this way a document may contain a plurality of parameters encrypted to different session keys, with some of the parameters being encrypted to a default session key, and others being encrypted to keys specified within the attributes of the tags which bound them. This technique could be employed, for example in the case of the EnrolmentData module 72, which contains a session key and the Enrolment encrypted to it, but which is then bundled with a message in the form of a document containing data encrypted to a further session key, it therefore being advantageous to distinguish between then, although since, in the illustrated example the EnrolmentData module 72 is passed in its entirety to the Clearance Centre 40, the need to distinguish is less critical.

Figure 9:
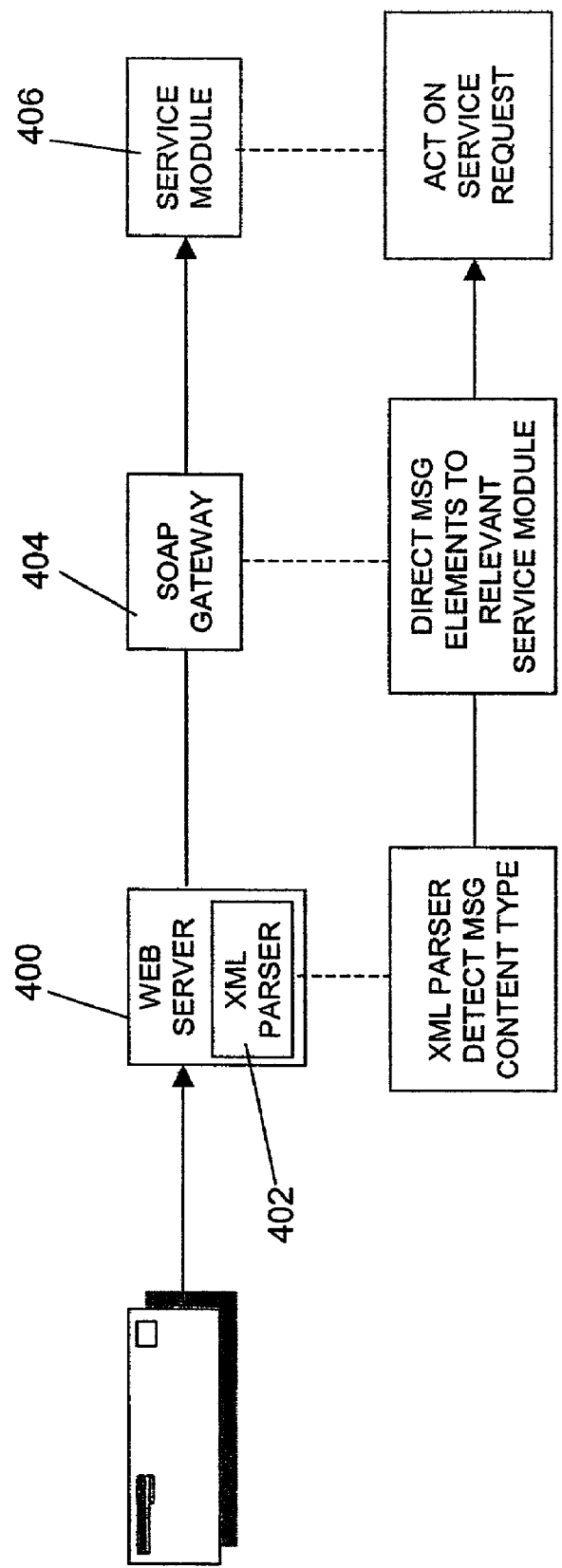
FIG. 9 is a schematic illustration of the architecture and method of operation of a web service including a SOAP gateway protocol handler.

Referring now additionally to FIG. 9, the handling of messages having a structure such as those illustrated in FIGS. 8 in accordance with SOAP will now be described, albeit in a simplified form. A message will initially be received by a web server 400, which, using what is known as an XML parser 402, determines from the part 210, 310 (in FIGS. 8*a* and 8*b* respectively) of the message external of the SOAP envelope whether the "content type" of the message is "text/xml", i.e. is a SOAP message. In the event that the content type indicates a message to be processed in accordance with SOAP, the web server 400 passes the message to a protocol handler, which in this instance is a SOAP gateway 404. The SOAP gateway directs elements of the message to their appropriate destination, which is typically a computing module 406 dealing with a service request, for example. Thus the SOAP gateway 404 deals initially with the SOAP header part of the message, and then the SOAP body, since the header typically contains, inter alia message authentication by digital signature (not illustrated), the session key, and possibly metadata, one or more of which may be required in prior to dealing with the SOAP body part of the message. Elements of the message routed by the SOAP gateway to the appropriate service module 406 are then dealt with and processed by that module on the basis of the character strings within the various XML tags.

Messages have been illustrated in the illustrated embodiments as having the form of modular XML documents. However documents (modular where appropriate) created using other forms of structuring may be used, regardless of whether the instructions for the document structure are evident, as in the case of a tag-oriented markup language such as XML or HTML for example, or "hidden", as in the case of documents created using Microsoft Word (Microsoft and Word are Trademarks of Microsoft corp.), for example, provided that the message structure is comprehensible by a programme required to process the message.

The invention claimed is:

1. A method of requesting a service from a first enterprise, wherein at least an aspect of a request for the service requires authorisation by a second enterprise, the method comprising the steps of:
   generating a document having a first module including first data, and a second module including encrypted second data;
   sending the document to the first enterprise;
   at the first enterprise, separating the first and second modules, and sending the second module to the second enterprise;
   at the second enterprise, decrypting the second encrypted data within the second module, and on the basis of the second data, generating an authorisation for the first enterprise to proceed with the service request; and
   sending the authorisation to the first enterprise.

2. A method according to claim 1 wherein the second module additionally includes data required in order to decrypt the second encrypted data.

3. A method according to claim 2 wherein the data required to decrypt the second encrypted data is a session key, encrypted to a public key of the second enterprise.

4. A method according to claim 1 wherein the second module is located within the first module.

5. A method according to claim 1 wherein the document is structured so that the first and second modules are separately located.

6. A method according to claim 1 wherein the first module additionally contains encrypted data, and data required to decrypt the first encrypted data.

7. A method according to claim 6 wherein the data required to decrypt the first data is a session key, encrypted using a public key of the first enterprise.

8. A method according to claim 1 wherein the first data additionally includes a public key of a requester of the service.

9. A method according to claim 8 further comprising the step of sending a reply to the service request to the requester, the reply being encrypted to the public key of the requester.

10. A method according to claim 9 wherein the reply is encrypted to a session key included within the reply, and the reply is encrypted to the public key of the requester as a result of the session key being encrypted to the public key of the requester.

11. A method according to claim 1 wherein the modules of the document are defined by a markup language.

12. A method according to claim 11 wherein the document is an XML document and the first and second modules are defined by XML tags.

13. A method of communicating with first and second enterprises via a publicly accessible network comprising the steps of:
   generating a markup language request document containing first data for processing by the first enterprise, and second data, encrypted for decryption by the second enterprise, and structuring the document to locate the first data in a first module of the document, and the second data in a second module of the document, separable from the first module without decryption of the second module;
   sending the request document to the first enterprise;
   passing the second module to the second enterprise;
   decrypting encrypted data within the second module;
   mapping at least one parameter in the second module to at least one parameter interpretable by the first enterprise;

generating a further document including at least the interpretable parameter; and sending the further document to the first enterprise.

14. A message according to claim 13 wherein data within the second module is encrypted to a session key which is included within the second module.

15. A method according to claim 13 further comprising the step, prior to sending the further document to the first enterprise, of encrypting the interpretable parameter to the public key of the first enterprise.

16. A method according to claim 13, wherein the method further comprises the steps, subsequent to receipt of the further document from the second enterprise, of:

generating a reply document, including a reply to the service request;

encrypting the reply to the service request to a session key; and sending the reply document to the end user together with the further session key.

17. A method of exchanging messages between a first and a second party in accordance with an XML-based messaging Protocol comprising the steps of:

generating, on behalf of the first party, an outbound message including a first XML document, and including within the first XML document an outbound session key to which at least part one parameter within the first XML document is encrypted;

generating on behalf of the second party a reply message including a second XML document, and including within the second XML document a reply session key to which at least one further parameter within the second XML document is encrypted.

18. A method according to claim 17 wherein the reply session key is the same as the outbound session key.

19. A method according to claim 17 wherein the reply session key is different to the outbound session key.

20. A method according to claim 17 further comprising the step of including a public key of the first party in the outbound message, to enable encryption of the reply session key to the aforesaid public key.

21. A method according to claim 20 wherein the outbound message additionally includes a service request written in decrypted form.

22. A method according to claim 17 wherein the messaging protocol requires each message including an XML document to include a message header and a message body, the outbound and reply session keys each being located within the header.

23. A method according to claim 22 wherein the header additionally contains a signature to authenticate provenance of the message.

24. A method according to claim 17, wherein the outbound message includes a plurality of modules defined by XML tags, wherein one of the modules contains the outbound session key, and a different module contains data encrypted to the outbound session key.

25. A method according to claim 17 wherein the outbound message includes a plurality of modules defined by XML tags including: a first module containing a default session key, a second module containing at least one parameter encrypted to the default session key, and a further module containing a special session key and a special parameter encrypted to the special session key.

26. A method according to claim 25 wherein an indication that the special parameter is encrypted with a session key other than the default session key is contained within attributes of XML tags defining the further module.

27. A computer system configured to use the method of requesting a service from a first enterprise according to claim 1.

28. A computer system configured to use the method of communicating with first and second enterprises according to claim 13.

29. A computer system configured to use the method of exchanging messages between a first party and a second party according to claim 17.

* * * * *